(12) United States Patent
Nukala Venkata Naga

(10) Patent No.: US 12,197,382 B2
(45) Date of Patent: Jan. 14, 2025

(54) HANDLING FAULTED DATABASE TRANSACTION RECORDS

(71) Applicant: Oracle International Corporation, Redwood Shores, CA (US)

(72) Inventor: Rama Krishna Surendra Nath Nukala Venkata Naga, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 139 days.

(21) Appl. No.: 16/780,862

(22) Filed: Feb. 3, 2020

(65) Prior Publication Data

US 2021/0240658 A1     Aug. 5, 2021

(51) Int. Cl.
G06F 16/11     (2019.01)
G06F 16/18     (2019.01)

(52) U.S. Cl.
CPC ........ G06F 16/122 (2019.01); G06F 16/1865 (2019.01)

(58) Field of Classification Search
CPC . G06F 16/122; G06F 16/1865; G06F 16/2379
See application file for complete search history.

(56) References Cited

U.S. PATENT DOCUMENTS

| 10,474,645 B2 | 11/2019 | Freedman et al. |
| 2001/0047313 A1 | 11/2001 | Kanai |
| 2012/0266185 A1* | 10/2012 | Davis ................. G06F 11/2294 719/317 |
| 2015/0242439 A1* | 8/2015 | Freedman ........... G06F 16/2322 707/703 |

(Continued)

OTHER PUBLICATIONS

Iskander et al., "Balancing Performance, Accuracy, and Precision for Secure Cloud Transactions", IEEE Transactions on Parallel and Distributed Systems, vol. 25, Issue 2, Feb. 2014, pp. 417-426.

(Continued)

*Primary Examiner* — Mark D Featherstone
*Assistant Examiner* — Samuel C Sharpless, III
(74) *Attorney, Agent, or Firm* — Kilpatrick Townsend & Stockton LLP

(57) ABSTRACT

Database transaction records that are received for committing data to a database may be associated with one or more validation tasks. When one of the validation tasks fails, the fault is detected and processing of the transaction record is halted. Instead of terminating the transaction record and requiring the submitting system to reinitiate the process, the system may use a mapping table to determine whether an automatic resubmission is possible. A new transaction record may be generated that copies an invocation context from the original transaction record, and portions of the transaction payload may be copied to the new transaction record with changes that ensure the new transaction record will pass the validation tasks. The new transaction record can then be submitted through the same interface that received the original transaction record, and the original transaction record can be removed from a transaction data store.

20 Claims, 10 Drawing Sheets

(56) References Cited

U.S. PATENT DOCUMENTS

2020/0387395 A1* 12/2020 Viale .................. G06F 16/2379

OTHER PUBLICATIONS

International Application No. PCT/US2021/012391, International Search Report and Written Opinion mailed on Apr. 29, 2021, 12 pages.
International Application No. PCT/US2021/012391, International Preliminary Report on Patentability mailed on Aug. 18, 2022, 8 pages.

* cited by examiner

| 204 Name | 206 Status | 208 Process Name | 210 Submitted On | 212 Submitted By |
|---|---|---|---|---|
| HCM 2003432_1 | ⊗ | Document Approval | Aug 1, 2019 | Lee, Gary |
| PO 1002361_0 | ⊗ | Document Approval | Aug 8, 2019 | Vance, Bob |
| PO 5000096_1 | ⊗ | Document Approval | Aug 8, 2019 | Smith, Joe |
| HCM 2002224_0 | ⊗ | Document Approval | Aug 11, 2019 | Lee, Gary |
| BPA 1008952_0 | ⊗ | Document Approval | Aug 16, 2019 | Purt, Neil |
| HCM 2000808_1 | ⊗ | Document Approval | Aug 3, 2019 | Ziv, Alex |
| BPA 1001076_0 | ⊗ | Document Approval | Jul 29, 2019 | Lee, Gary |

202 ^ Status
Auto Recovery
Completed
Draft
Failed
In Progress
Stuck
Submitted Actions ▶ 214

FIG. 2

Transaction Manager:Transactions — 400

| | | Status | Process Name | Submitted On | Submitted By |
|---|---|---|---|---|---|
| ^ Status | | | | | |
| Auto Recovery Completed | ☐ HCM 2003432_1 | ⊗ | Document Approval | Aug 1, 2019 | Lee, Gary |
| Draft | ☐ PO 1002361_0 | ⊗ | Document Approval | Aug 8, 2019 | Vance, Bob |
| Failed | ☐ PO 5000096_1 | ⊗ | Document Approval | Aug 8, 2019 | Smith, Joe |
| In Progress | ☐ HCM 2002224_0 | ⊗ | Document Approval | Aug 11, 2019 | Lee, Gary |
| Stuck | ☐ BPA 1008952_0 | ⊗ | Document Approval | Aug 16, 2019 | Purt, Neil |
| Submitted | ☐ HCM 2000808_1 | ⊗ | Document Approval | Aug 3, 2019 | Ziv, Alex |
| | ☐ BPA 1001076_0 | ⊗ | Document Approval | Jul 29, 2019 | Lee, Gary |

Actions ▼ — 402
  Terminate Process
  Recover

FIG. 4

| Transaction Status | EDN Event Status | SOA Composite Instance Status | BPM WF Task Status | Transaction Resubmit Requirement |
|---|---|---|---|---|
| Draft | Not Raised | Not Created | Not Created | N/A |
| Submitted | Completed | Instance Initiated | Task Initiated | If EDN Event, Composite Instance or WF Task is not created |
| In Progress | Completed | Instance Created | Task Created | If SOA Composite or Task is in error status |
| Auto Recovery | Completed | Instance Created | Task Created | It is a healthy pending status. Resubmit not required. |
| Manual Recovery | Completed | Instance Created | Task Created | If the recovery is not feasible, Terminate the transaction and Resubmit |
| Error | Completed | Error Status | Error/Healthy Status | Terminate and Resubmit the Transaction |
| Completed | Completed | Instance Completed | Task in Stale Status | Resubmition is not required |

HANDLING FAULTED DATABASE TRANSACTION RECORDS

BACKGROUND

A database transaction symbolizes a process that is performed within a database management system against a database. The transaction is typically represented by a transaction record that represents aspects of a request to make one or more changes to the database, including values that should be changed, tables that should be accessed, and other descriptive information. Within the database management system, the transaction record may generate multiple operations executed on multiple tables within the database management system. However, the transaction as a whole may be represented by the transaction record as one atomic, consistent, isolated, and durable process.

In order to prevent unapproved or incorrect transaction records from being committed to the database, some transaction records may include one or more validations that may be executed against the transaction record before the database commit is allowed. These validations may include receiving authorization from additional systems/users, as well as validation rules that are executed against values in the transaction record. When a transaction record fails the validation procedure, the database management system prevents the transaction record from being committed to the database. The transaction record may then be canceled, and the system providing the transaction record may be notified of the failure.

SUMMARY

Database transaction records that are received for committing data to a database may be associated with one or more validation tasks. When one of the validation tasks fails, the fault is detected and processing of the transaction record is halted. Instead of terminating the transaction record and requiring the submitting system to reinitiate the process, the system may use a mapping table to determine whether an automatic resubmission is possible. A new transaction record may be generated that copies an invocation context from the original transaction record, and portions of the transaction payload may be copied to the new transaction record with changes that ensure the new transaction record will pass the validation tasks. The new transaction record can then be submitted through the same interface that received the original transaction record, and the original transaction record can be removed from a transaction data store.

When a transaction record is initially received to be committed to the database, it may be associated with the validations that may be required before it is committed to the database. An event may be raised that initiates processing of the transaction record. Additionally, a transaction object may be written to a transaction data store that includes the transaction, an invocation context for the transaction, and other descriptive material. The invocation context may include metadata that describes the origination of the transaction record, such as a user name, user ID, a source application interface, identifiers for users that submit, modify, edit, or otherwise interact with the transaction record, submission dates/times, and so forth. The transaction data store may also maintain a runtime status of the transaction record as it is processed by the system.

When the event is raised to initiate processing of the transaction record, a composite may be identified for the transaction record, and a composite instance for that record may be generated. The composite instance acts as a blueprint to assemble and execute tasks for each of the validations for the transaction record. The validation tasks may include user authorizations and validation rules for transaction data. When a validation task fails, the system may store any fault details in the transaction data store, and send a notification of the fault to a monitor process that communicates with a transaction console. An administrative account may monitor any tasks that fail through the console application. Instead of simply terminating the task and notifying the user that the process must be restarted from scratch, the administrative account can initiate a resubmission process that is transparent to the end-user.

A mapping table may be used to determine whether a set of criteria are met to allow a resubmission of a new transaction. The mapping table may use current statuses of the transaction record in the processing pipeline, such as event statuses, composite statuses, task statuses, and so forth. If these criteria are met, a new transaction object may be generated, and the initial invocation context may be copied from the transaction data store. Values in the transaction payload may also be copied and/or altered such that the transaction record will subsequently pass the validation tasks. By copying the invocation context, the transaction may be submitted through the original interface such that the system still notifies the original user when the process is complete.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 2 illustrates a user interface that may be generated by the transaction console application, according to some embodiments.

FIG. 4 illustrates a user interface for the transaction console application during a resubmit process, according to some embodiments.

FIG. 7 illustrates a mapping table that may be used to determine resubmission criteria for each processing stage of a transaction record, according to some embodiments.

DETAILED DESCRIPTION

Figure 1:
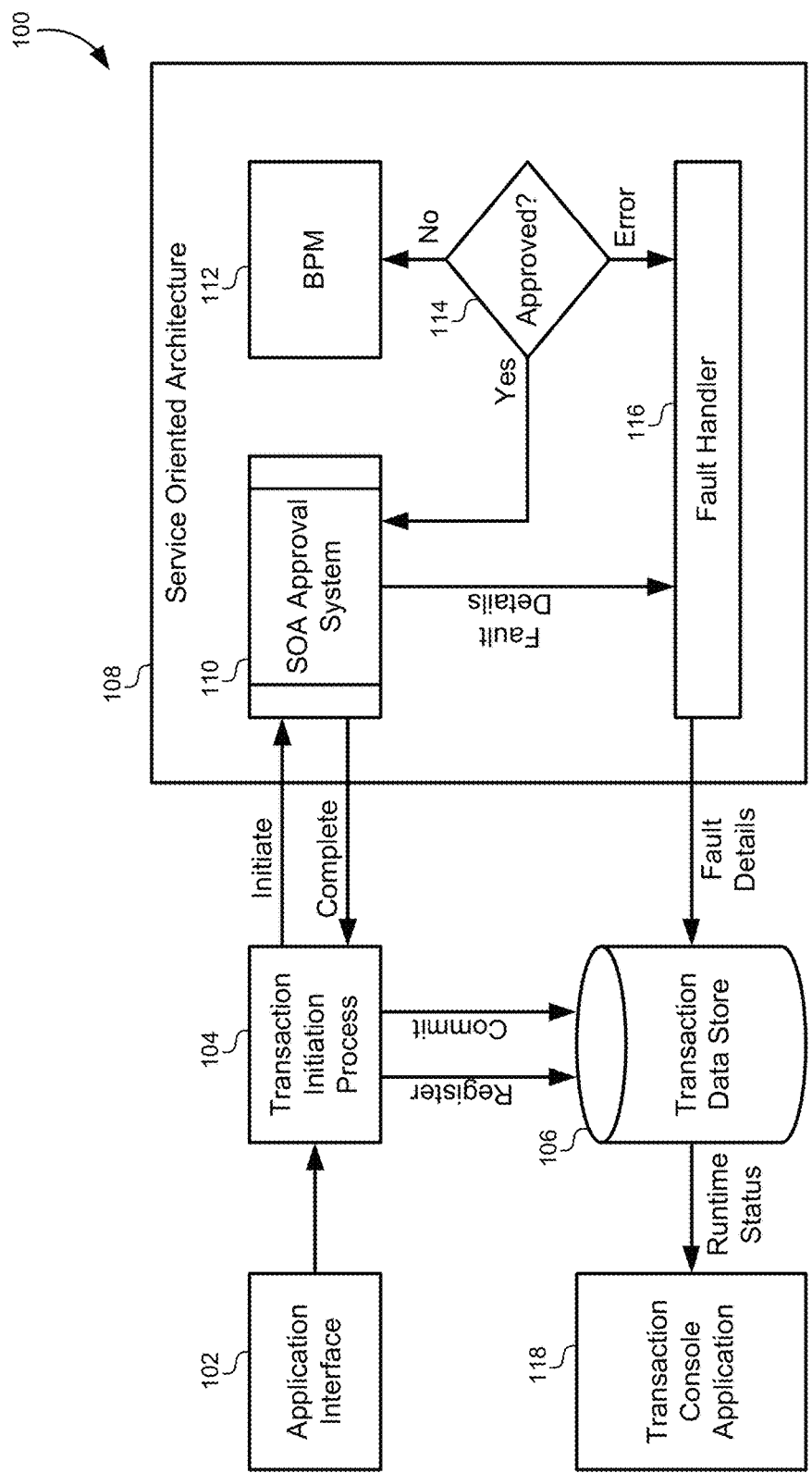
FIG. 1 illustrates a system diagram of an architecture for receiving, validating, and/or committing transaction records to a database, according to some embodiments.

Described herein are embodiments for resubmitting faulted database transaction records. Database transaction records that are received for committing data to a database may be associated with one or more validation tasks. When one of the validation tasks fails, the fault is detected and processing of the transaction record is halted. Instead of terminating the transaction record and requiring the submitting system to reinitiate the process, the system may use a mapping table to determine whether an automatic resubmission is possible. A new transaction record may be generated that copies an invocation context from the original transaction record, and portions of the transaction payload may be copied to the new transaction record with changes that ensure the new transaction record will pass the validation tasks. The new transaction record can then be submitted through the same interface that received the original transaction record, and the original transaction record can be removed from a transaction data store.

Many operating environments, including cloud-based environments, are built on top of complex layers in a technical stack of software. Transaction records that are submitted by end-users through application interfaces often result in faults or failures. Such faults can occur in many different stages of the process due to many different reasons. However, regardless of the reason, when faults occur in transaction submitted through user applications, the end-users who submitted those transaction records are often notified that the transaction record has failed. After this notification, the only option for the end-user is to manually reconstruct the transaction and manually resubmit the transaction record through the user interface. The original transaction is typically canceled and a new transaction is required to commit the transaction data to the database.

A transaction record fault or "fault incident" may include any situation where a transaction is not progressing towards being committed on the database. The situations that may cause a transaction record fault may be broadly subdivided into at least two categories. First, faults may be caused by system errors. System errors may include any hardware and/or software problem with the receiving system such that it is unable to execute an otherwise valid transaction. For example, a system error may include a server that is temporarily unavailable or unreachable. In another example, a system error may include writing to a database that is currently being upgraded or offline. In another example, a system error may include a network outage or lack of bandwidth in a communication system. In each of these situations, the problem with the hardware/software of the receiving system may be at fault rather than the transaction itself.

When system errors are encountered, the application submitting the transaction record may use a series of retry intervals in order to execute the transaction. For example, system faults may be automatically recovered by periodically resubmitting the transaction. In some cases, various backoff algorithms may be used where the retry interval is gradually increased with each resubmission (e.g., retrying after 5 minutes, 15 minutes, 30 minutes, 60 minutes, etc.). As the retries are submitted, the hardware and/or software error that initially caused the fault to occur is likely to be fixed between retry intervals such that the transaction will eventually be successful.

In contrast to system errors, a second category of faults may be due to a validation failure. Some transactions may be subject to one or more "validations" or "validation rules." If any of the validations fail, the transaction may be rejected such that the data is not committed to the database. These validations may be performed on a payload of the transaction to verify that the transaction abides by a set of rules prior to committing the data to the database. For example, for the class of data generally referred to as "business data," validations may include one or more business rules that are verified by a Business Process Manager (BPM) as part of an automated business process. Validation rules and/or algorithms may be written in a Business Process Execution Language (BPEL) and executed by the BPM on a payload of the transaction. For example, a transaction record requesting time off may be received from a user through a time management application. The validation rules associated with such request may include a rule that compares a number of available vacation days assigned to that user with the number of vacation days being requested. Another rule may include a comparison of the dates requested to a set of days where attendance is required. The time off may be approved and the request may be committed to a database for the employee record only if these validation rules are met.

Note that the use of a BPM with BPEL validation algorithms is provided only by way of example and is not meant to be limiting. The embodiments described below are designed to be compatible with any set of validations on a transaction record to be committed to any type of database. For example, a Database Management System (DBMS) may include any type of data validation rules before a transaction is committed to the database. However, the examples described below use a specific type of system architecture as an example. This architecture may include transaction records received from cloud-based applications that are submitted to a Service Oriented Architecture (SOA) that executes a BPM to validate transaction records.

The embodiments described below provide and administer a console application that allows pending transactions to be navigated based on their status. This in turn allows transaction records that have generated faults due to validation errors to be identified and corrected through an administrative account. The algorithms described below allow the administrative account account to generate a new transaction based on a faulted transaction by reusing a saved invocation context. This allows a new transaction to submitted and validated without requiring any action from an initial user that submitted the transaction. After submitting the initial transaction, the user may next be notified when the transaction is validated and committed to the database in a successful manner. The process of resubmitting a second transaction based on the initial transaction may be completely transparent to the end-user.

FIG. 1 illustrates a system diagram of an architecture 100 for receiving, validating, and/or committing transaction records to a database, according to some embodiments. The architecture 100 may include an application interface 102. The application interface 102 may include any application that is accessible to users with user accounts registered with the rest of the system. The application interface 102 may be generated as a user interface on a client device that communicates with a cloud environment. For example, cloud-based enterprise applications may be accessed through client devices and may perform any type of operation for an organization (e.g., human capital management (HCM) software, APIs, cloud-based data storage, etc.).

The application interface 102 may be configured to receive a transaction record submitted by a user using a corresponding user account. The user account may include a username, a user identifier (userID), and/or other identifying information, permissions, and data related to the user. When the user account generates the transaction record, the record may be associated with an "invocation context." The invocation context may include any metadata that describes the transaction record itself. For example, the invocation context may include the user's name; the userID; references to users who updated, created, submitted, and/or otherwise affected the transaction record; submission/creation dates and times; authorization numbers; originating application identifiers; and/or the like. In some cases, information for the invocation context may be automatically extracted from the user account and/or a user profile.

The application context may be packaged with a payload of the transaction record. The payload of the transaction record may include information required for the request to commit data to the database. This may include data values, request types, database identifiers, and/or other information that may be required by the system to validate and/or commit the transaction record. The payload of the transaction record may be generated by a user interface that allows the user to populate a web form or otherwise provide data values and select a specific request type to be submitted. The application interface 102 may package the transaction record along with the invocation context and provide the submission for validation.

The architecture may also include a transaction initiation process 104 that receives transaction records and initiates a process for validating the transaction record and eventually committing the transaction data to the database. The transaction initiation process 104 may generate an event that may be submitted to various SOA systems 108 to initiate and execute the validation process. The collection of these SOA systems 108 and the transaction initiation process 104 may individually or collectively be referred to as process(es) for performing one or more validations associated with transaction records that are received. The event that is raised by the transaction initiation process 104 may include any type of event, such as an Event Delivery Network (EDN) event that is passed to the SOA systems 108.

The transaction initiation process 104 may also register the transaction with a transaction data store 106. A transaction object may be created and stored in the transaction data store 106 such that the transaction object includes information related to the transaction received from the application interface 102. The transaction object may include any or all of the information received as part of the transaction record, including the invocation context. The transaction object may also include additional fields, such as a runtime status and/or any fault information as described in greater detail below. The transaction data store 106 may be updated by various processes in the architecture 100 throughout the lifecycle of the transaction record. For example, the runtime status of the transaction object may be updated in real time, fault details may be written to the transaction object, and fields from the transaction payload may be used to validate the transaction.

The event that is received by the SOA systems 108 may cause the SOA systems 108 to generate all of the processes necessary for validating the transaction. For example, some embodiments may analyze the transaction type and identify an SOA composite that has been defined for that transaction type. An SOA composite is an assembly of services, service components, and/or references that are deployed together to validate the transaction. Essentially, the SOA composite may be considered a "blueprint" of one or more processes that should be executed to validate the transaction. Once the proper SOA composite has been identified, an SOA composite instance may be generated to define the various processes that may be required to validate the transaction record.

An SOA approval system 110 may operate according to the composite instance and begin execution of the various processes on a BPM 112. Each of the processes executed by the BPM 112 may execute one or more validation rules that validate the transaction. Some embodiments may require explicit approval by another user to validate the transaction. For example, some transactions may require manager or administrative approval. The processes executed by the BPM 112 may generate tasks that are sent to various users. These tasks may manage presenting the transaction record to the users for approval and receiving any approval/rejection from the users in response.

Once the users have responded to the approval requests, a determination may be made for each of the validation rules whether or not the transaction has been validated. A conditional 114 may be evaluated for the results of each validation process. If each of the results are validated, then the conditional 114 may return a positive indication to the SOA approval system 110. Then, the SOA approval system 110 may send an indication that the validation is complete to the transaction initiation process 104. This process 104 may then send a "commit" indication to the transaction data store 106. This may cause the status of the transaction object in the transaction data store 106 to be updated such that its status is updated to "complete." This indication may also cause the data in the transaction payload to be committed to a database (not shown).

Alternatively, the conditional 114 may determine that one or more of the BPEL processes executed by the BPM 112 could not validate the transaction record. For example, a user providing approval for the transaction may have denied the transaction. In another example, data in the transaction payload may have exceeded a limit enforced by one of the validation rules. If the transaction data cannot be validated, some embodiments may request that the BPM 112 try one or more additional times to validate the transaction record. Ultimately, if the transaction record cannot be validated, the conditional 114 may generate an error or fault.

Some embodiments may include an SOA fault handler 116 that executes fault handling policies when faults are generated by the SOA processes 108. The SOA approval system 110 can provide fault details to the fault handler 116 as part of, for example, a thrown fault exception. The fault details may include a particular validation rule that could not be satisfied and/or any other information describing the transaction record or the failure of the validation rule. The fault handler may execute a fault policy based on the type of fault that is generated.

The fault details may be passed to the transaction data store 106 and stored with the transaction object for this transaction record. This allows the transaction data store 106 to maintain a real-time description of the transaction record as it is processed. Any fault details can then be used to update the transaction object. Receiving fault details may also update the status of the transaction object in the transaction data store 106 to have a status of "fault" or "fail."

Some embodiments may provide a transaction console application 118. The transaction console application 118 may be configured to generate a graphical user interface (GUI) that provides a way to navigate all of the transactions that are active in the system. For example, the transaction data store 106 may provide transaction objects to the transaction console application 118 such that they can be browsed and/or edited by a user. Some embodiments may also provide a runtime status to the transaction console application 118 for transaction objects in the transaction data store 106. In some cases, the status of the transaction object in the transaction data store 106 may only be updated in response to certain events, such as an initial registration, a commit command, and/or the receipt of fault details. Other runtime statuses may be available and may be more descriptive. The statuses may be provided in addition to the transaction object such that the transaction console application 118 displays an accurate snapshot of the transaction record at its current stage in its lifecycle.

FIG. 2 illustrates a user interface 200 that may be generated by the transaction console application 118, according to some embodiments. The user interface 200 may extract transaction objects from the transaction data store 106 and display summary information in a list of transactions that are currently active in the system. For each of the transaction objects, the user interface 200 may extract information such as a name of the transaction 204, a status of the transaction 206, a name of a current process being executed 208 for validating the transaction, a date on which the transaction was submitted 210, a user account from which the transaction was submitted 212, and/or any other information stored in the transaction object in the transaction data store 106. Each of these transactions may be displayed in a list of transactions that is navigable as illustrated in FIG. 2. Users may select any of the available transactions and perform additional actions 214 that may currently be available for that transaction. The actions that are available may depend on the status and/or type of transaction record that is selected.

Various filters may be applied to the listed transaction records. In this example, a filter 202 has been executed using the status attribute of the transaction records. Various available attribute values may be displayed below the status attribute for the filter 202. These status attributes may indicate possible statuses for the transaction records, such as completed, draft, failed, in progress, submitted, and so forth. In this example, the value of "Failed" has been selected for the filter 202. This causes only transaction records that have a current status with the value of "Failed" to be displayed in the transaction record list on the right-hand side of the user interface 200.

The transaction console application 118 may use the user interface 200 to provide a way for an administrative account to quickly assess the status of any transactions in the system. This allows an administrative account to quickly identify any transaction records that have failed and then take remedial action. Prior to this disclosure, transaction records with a "Failed" status resulting from failed validation rules would be canceled by the administrative account. An indication would then be sent to the user account instructing the user to start from scratch and rebuild the transaction request in a way such that the validation error would no longer be triggered. This resulted in a time-consuming and error-prone process that required duplicate effort on the part of the users. This also caused a strain on computer resources. Any time a request failed, the additional network traffic used to transmit indications to the user accounts and application interfaces 102 would necessarily diminish the bandwidth available for new requests in the system. Therefore, the embodiments described herein allow the administrative account to automatically resubmit failed transaction records that generated a fault during a validation process without requiring involvement of the user account or the application interfaces 102 described above.

Figure 3:
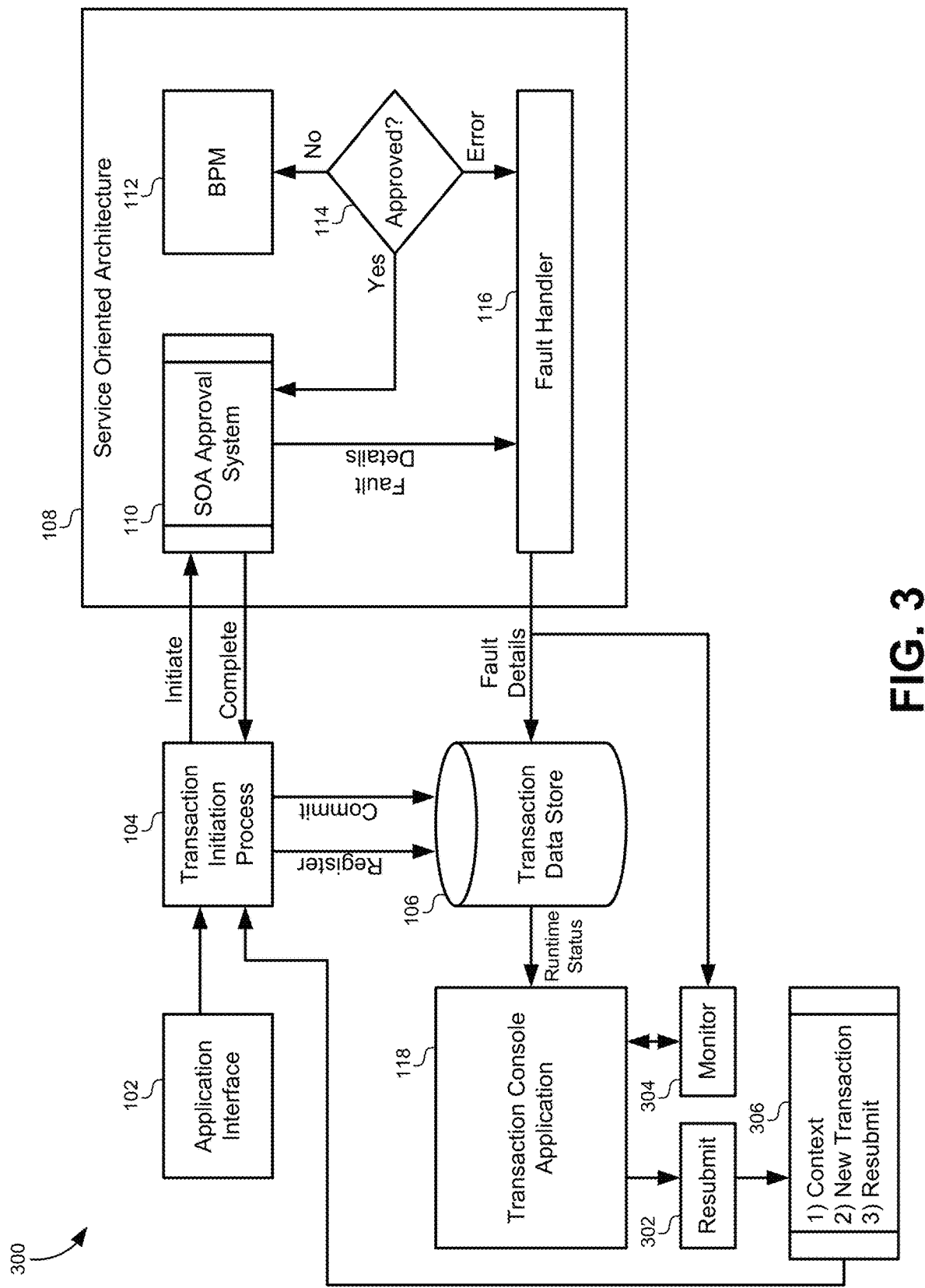
FIG. 3 illustrates a system diagram of an architecture that facilitates the resubmission of faulted transaction records, according to some embodiments.

FIG. 3 illustrates a system diagram of an architecture 300 that facilitates the resubmission of faulted transaction records, according to some embodiments. This architecture 300 is similar to the architecture 100 illustrated above in FIG. 1, however a number of additional utilities have been added to facilitate the generation and resubmission of faulted database transaction records by an administrative account. Recall that a fault will generally occur as the task workflow is executed by the BPM 112. This is often caused by a failure of validation rules or a rejected authorization from a human user, both of which may be classified as a "validation" for simplicity. When an error has occurred, the SOA fault handler 116 may receive an indication of the fault as well as the fault details that describe why the fault occurred, data values associated with the fault, the validation rule that failed, and/or any other descriptive information regarding the fault. These fault details may be passed to the transaction data store 106 and stored as part of the transaction object record in the transaction data store 106.

In this architecture 300, a monitor process 304 may be added to be in communication with the transaction console application 118. The fault details from the SOA fault handler 116 may be sent to the monitor process 304 in addition to the transaction data store 106. This allows the monitor process 304 to receive real-time updates of any faults that occur in the system. The transaction console 118 can provide summary information for any of the pending transactions, and the monitor process 304 can immediately cause the console to display any fault details associated with the displayed transactions. As described above, the transaction console application 118 may allow the administrative account to filter the pending transactions according to a status. This may be used to identify any of the transaction records that are currently in a fault condition.

Prior to this disclosure, a faulted transaction record would result in the administrative account clearing the transaction record from the transaction data store 106. This would also generate an indication sent to the end-user notifying the end-user that the fault had occurred. At this point, the end-user would be required to start over and resubmit a new transaction record that would pass the validations that were failed in the previous attempt.

This architecture 300 allows the system to recover and resubmit the transaction record without requiring any input from the user account. A resubmit process 302 may be provided through the transaction console application 118 such that the administrative account can re-create, edit, and resubmit the faulted transaction record. When a faulted transaction record is selected in the transaction console application 118, one of the available actions may include a resubmit action that automatically performs a number of algorithms in the background to populate and submit the new transaction record.

After a resubmit action is initiated, a plurality of resubmit tasks 306 may be executed to generate and submit the transaction record. First, the tasks 306 may include an algorithm that reads the invocation context from the transaction data store 106 for the original faulted transaction record. Recall that the invocation context from the transaction data store 106 may include information associated with the initial generation and submission of the transaction record through the application interface 102 using the user account. Thus, the invocation context may include information descriptive of the original end-user, a reference to the application interface 102, dates and times when the original transaction record was submitted, and so forth. If the administrative account attempted to re-create the faulted transaction record using traditional means, the new transaction submitted to the transaction initiation process 104 would necessarily include a new invocation context that referenced the administrative account, the current date and time, and some other application interface. This invocation context would then cause the system to send completion messages to the administrative account, and it may remove the transaction from the visibility of the original end-user. Instead of requiring changes to be made to the transaction initiation process 104 or other elements of the architecture 300, the resubmit tasks 306 may copy over at least a portion of the invocation context from the original transaction record in the transaction data store 106. This allows the new transaction record being generated to appear to the system as though it were the original transaction record created by the application interface 102.

In some embodiments, the resubmit tasks 306 may allow the copying of the invocation context to be configurable by the administrative account. For example, some types of tasks may be generated such that the create/submit times are changed to the current time when the new transaction record is generated. Some situations may require the administrative account to be referenced by the invocation context rather than the end-user. Each of these different situations depends on the particular type of task and/or the requirements of particular applications. Therefore, the administrative account may customize how fields are copied from the original invocation context and instead replace them with fields that would represent a current invocation context.

The resubmit tasks 306 may also include a task that generates a new transaction. Note that the transaction submitted from the original application interface 102 to the transaction initiation process 104 may be referred to herein as a "transaction," while the corresponding object stored in the transaction data store 106 may be referred to as a "transaction object." This is done merely to distinguish the transaction received by the transaction initiation process 102 from what is later stored in the transaction data store 106. However, it should be understood that the application interface 102 will package information describing the transaction into an object that is passed to the transaction initiation process. Information from that object may then be stored as part of another object in the transaction data store 106. The transaction object in the transaction data store 106 may include any/all fields from the object received at the transaction initiation process 104, along with other information, such as a status, fault details, a current process being executed, an invocation context, and so forth.

The new transaction generated by the resubmit tasks 306 may generate a new object that includes at least part of the original invocation context as described above. The new transaction may also include any/all fields from the original transaction as stored in the transaction data store 106. For example, a request for changing a user status may include an old status as well as a new status. These statuses may be copied over to the new transaction. In another example, a request for scheduling vacation time may include dates, vacation days, and so forth, and these fields may also be copied to the new transaction. In some cases, the new transaction may look substantially the same as the original transaction.

Some embodiments allow the administrative account to make changes to the original transaction payload that is copied from the original transaction. For example, some original transactions may include invalid data fields or data fields that violate one or more validation rules and thereby cause the original fault to occur. The administrative account may take additional action at this stage such that the new transaction may pass the validations when it is resubmitted. For example, an administrative account may change one or more of the fields in the original transaction payload such that it no longer violates a validation rule, such as exceeding a number of days that may be requested for vacation. In another example, the administrative account may leave the fields in the new transaction to be the same as the original fields, but the administrative account may take action external to the transaction such that the transaction record will pass the validations. Continuing with the vacation example above, the administrative account may cause the user account to acquire more vacation days or transfer vacation days from another user such that the original quest may now pass the required validations. Once any changes are made, the new transaction may be packaged as an object.

The resubmit tasks 306 may also include a task that resubmits the new transaction to the transaction initiation process 104. The new transaction may be submitted through the same interface that the original transaction was submitted from the application interface 102. This allows the transaction initiation process 104 to treat the new resubmitted transaction record the same as it treats any other submission from any application interface. This also allows the transaction initiation process 104 and the SOA 108 to process the new transaction record without any changes to the way in which they operate. For example, the transaction initiation process 104 may register the new transaction in the transaction data store and raise a new EDN event such that the SOA 108 generates a new composite instance to begin processing the validations for the resubmitted database transaction record.

In some embodiments, the task that resubmits the new transaction may also cause the transaction object corresponding to the original transaction to be removed from the transaction data store 106. Because the transaction initiation process 104 may receive and process the new transaction record, it may provide a new transaction object to the transaction data store 106. This allows the original transaction record may be removed to avoid duplicate objects and confusion for the end-user. This prevents notifications from being sent to the end-user account related to the faulted transaction that is being canceled and replaced with the new transaction record. Any notifications generated for the end-user account related to the new transaction may instead reference the copied invocation context, and may thus appear to the end-user account as referencing the original transaction. This also allows the resubmission process to be entirely transparent to the end-user account.

FIG. 4 illustrates a user interface 400 for the transaction console application 118 during a resubmit process, according to some embodiments. Using the monitor process 304 from the architecture 300 of FIG. 3, the user interface 400 may provide a list of transactions that are filtered from the global list of transactions by virtue of having a "Failed" status. The information displayed may include a real-time status of a stage in the validation process in which the failure occurred. For example, each of the transaction records displayed in the user interface 400 failed during the "Document Approval" stage, which likely corresponds to a rejection by a human approver.

When the administrative account selects one of the transaction records displayed in the user interface 400, a number of actions 402 may become available. First, one of the actions 402 may allow the administrative account to terminate the process. As described above, this removes the transaction record from the transaction data store 106 and from the user interface 400. In some cases, this may also send a notification to the end-user account that the process has been terminated for this transaction record. This allows the end-user to start over and submit a new transaction record.

Another one of the actions 402 may include a recover action. By selecting the recover action, the administrative account may initiate the resubmit tasks 306 described above. For example, selecting the recover action may copy at least of portion of the original invocation context, import one or more of the fields from the original transaction payload, generate a new transaction object, and submit the new transaction object to the transaction initiation process 104. This may also remove the original transaction from the user interface 400 when the corresponding transaction object is removed from the transaction data store 106. If the filter criteria for displaying transaction records were changed in the user interface 400, the new transaction would subsequently appear as a transaction without having a "Failed" status.

Figure 5:
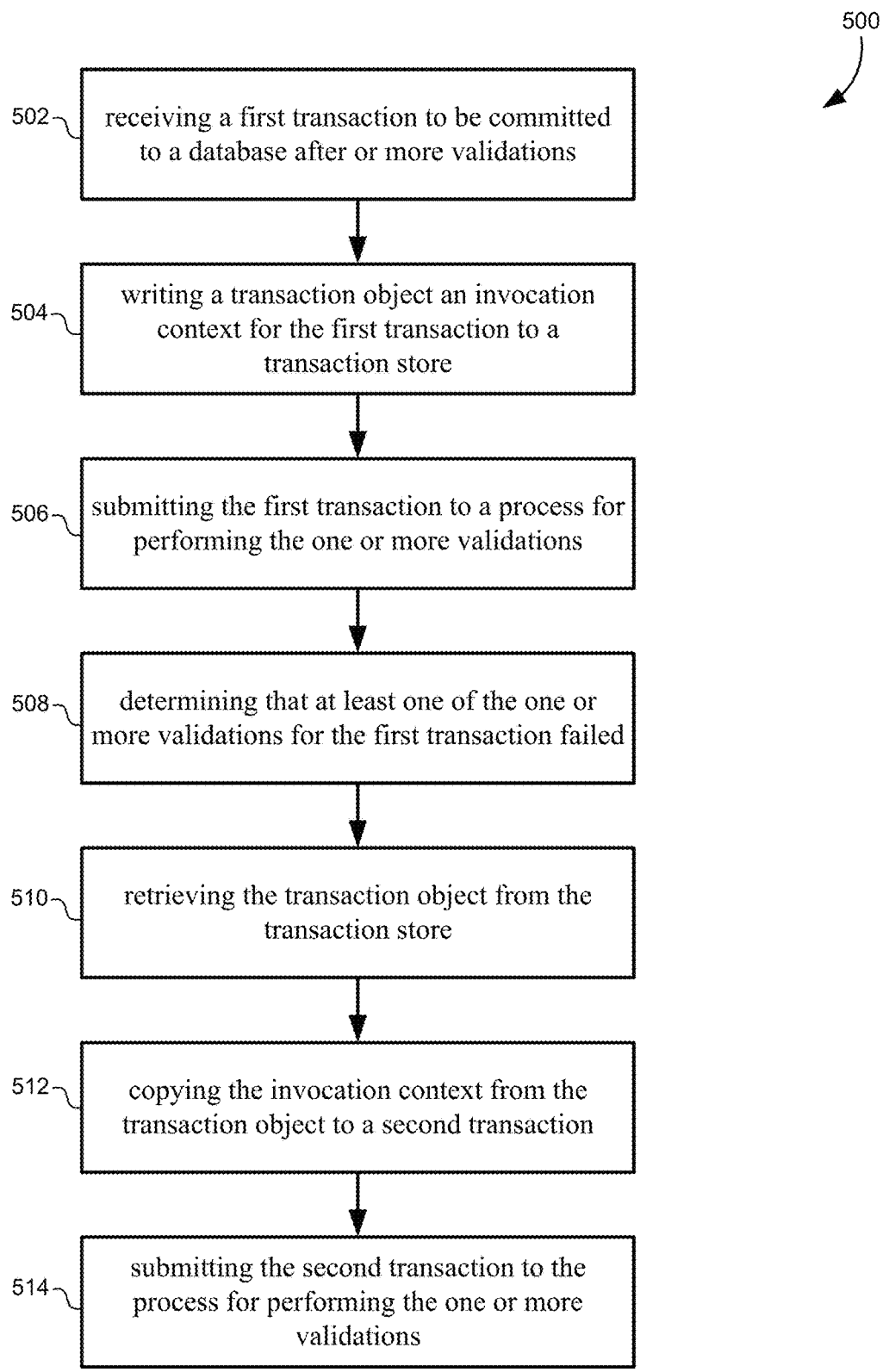
FIG. 5 illustrates a flowchart of a method for resubmitting failed database transaction records, according to some embodiments.

FIG. 5 illustrates a flowchart 500 of a method for resubmitting failed database transaction records, according to some embodiments. The method may include receiving a first transaction to be committed to a database (502). The first transaction may be received from an application interface as described above, and may include any type of transaction that updates, adds, and/or removes data in a database. The first transaction may be accompanied by one or more validations to be completed before being committed to the database. For example, validations may include satisfying validation rules, receiving automated and/or human approvals, and/or any other type of requirement.

The method may also include writing a transaction object to a transaction data store (504). The transaction data store may receive transaction objects for each transaction received by the system. The transaction object may include a payload of the original transaction, along with metadata describing the transaction. In some embodiments, the transaction object may store an invocation context comprising a reference to an end user that created the transaction record, an application on which the transaction was generated, dates/times when the transaction record was created, submitted, modified, or otherwise received an interaction, and so forth. The transaction object may later store additional information as the transaction record is processed in the system, including a runtime status, fault details, processes executed, validations passed, and so forth.

The method may additionally include submitting the first transaction to a process for performing the one or more validations (506). This process may include a plurality of sub-processes, such as a transaction initiation process that passivates the transaction, stores the transaction object in the transaction data store, and raises an event (such as an EDN event) to initiate transaction processing. This may also include processes that are part of an SOA, such as an SOA approval system and a BPM. Processes within the SOA may identify a composite, generate a composite instance to govern how the transaction is processed, and execute BPEL tasks in a BPM workflow to perform the validation tasks. These various processes are illustrated in detail above in FIG. 1 and FIG. 3.

The method may further include determining that at least one of the validations for the first transaction failed (508). This failure may include failing one or more validation rules that validate data within the transaction record. The failure may also include a rejection by a user account tasked with providing human approvals for the transaction record. This failure may be captured by an SOA fault handler that aggregates the fault details describing the various characteristics of the fault. Some embodiments may store the fault details in a transaction data store and/or report the fault details to a monitor in a transaction console application as described above in FIG. 3.

The method may also include retrieving the transaction object from the transaction data store (510). This transaction object may be associated with the original transaction, and may be retrieved when a resubmit action is selected from a transaction console application. Retrieving the original transaction object may be part of a number of algorithms that initiate the resubmission of a new task based on the failed task as described above in relation to FIG. 3 and FIG. 4.

The method may additionally include copying the invocation context from the transaction object to a second transaction (512). The second transaction may be a new transaction that is generated to replace the original transaction. Any/all of the original invocation context may be copied from the original transaction object over to the new transaction to make the new transaction appear to the system as if it originated from the same user, at the same time, and from the same place as the original transaction. In some embodiments, the system may also copy over any/all of a transaction payload from the original transaction object into the new transaction. The administrative account may make changes to data fields in the second transaction. The administrative account may alternatively or additionally make changes or execute processes that are external to the transaction such that the original transaction payload will pass the validations.

The method may also include submitting the second transaction to the process for performing the one or more validations (514). The submission of the second transaction may be received through an interface that is the same or similar to an interface that received the original first transaction from the application interface. Submitting the second transaction may again raise an EDN event, generate a composite instance, initiate a set of tasks executed by the BPM, and so forth. This resubmission may be completed without involving additional inputs from the end-user account.

It should be appreciated that the specific steps illustrated in FIG. 5 provide particular methods of resubmitting faulty database transaction records according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
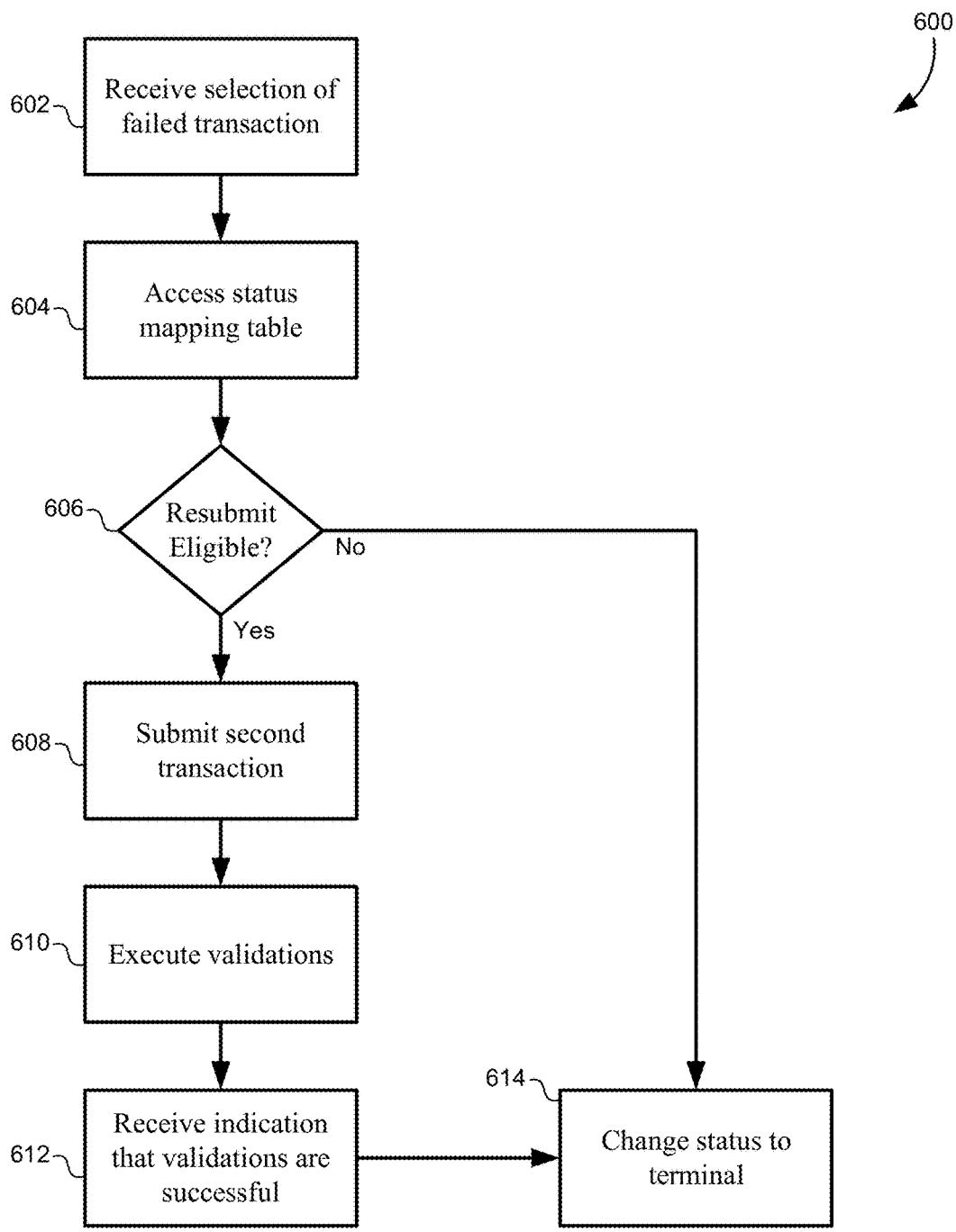
FIG. 6 illustrates a flowchart of a method for executing a resubmission of a failed transaction record, according to some embodiments.

FIG. 6 illustrates a flowchart 600 of a method for executing a resubmission of a failed transaction record, according to some embodiments. Flowchart 600 describes additional steps that may be taken during the resubmission process described above in flowchart 500, steps 510-514. The method may include receiving a selection of a failed transaction record (602). The selection may be received through the transaction console, and may be accompanied by a selection of an action indicating that the failed transaction should be recovered. In some embodiments, the selection may include multiple transactions to be recovered through the same process.

The method may also include accessing a mapping table to determine whether the selected transactions are eligible for being resubmitted (604). The ability to resubmit the transaction record may depend on the current stage of the transaction record as it is processed from submission to completion. At each processing stage, certain criteria may need to be met if the transaction record is to be resubmitted using the process described above.

FIG. 7 illustrates a mapping table 700 that may be used to determine resubmission criteria for each processing stage of a transaction record, according to some embodiments. The process may identify a runtime status of the transaction record when the fault occurs. This process may be listed in the first column of the mapping table 700, and may be used as a key to look up other values in the table. Available statuses for the transaction record may include draft, submitted, in progress, auto recovery, manual recovery, error, and completed. Each of these transaction statuses may also include statuses for the EDN event that initiates the validation process, as well as a status of the SOA composite instance and a status of the BPM task(s). For example, for a transaction that is submitted, and where the EDN event has been raised and the composite instance has been initiated, a resubmission may be allowed if one of the event, the composite instance, and/or the BPM task has not yet been created. In another example, if the transaction status is in an error state, the transaction may be terminated and resubmitted as described above.

Turning back to FIG. 6, if the current status of the transaction according to the mapping table determines that the transaction record is not eligible for resubmission (606), then the status of the transaction record may be changed to "terminal" indicating that the status has been terminated. The end-user may then need to resubmit the transaction manually as described above.

Alternatively, if it is determined that the transaction record is eligible for resubmission, then a second transaction may be initiated as described above (608). This may include cleaning up or clearing the status of the transaction object for the previous transaction in the transaction data store and the corresponding SOA composite instance. This may also include querying the EDN event details and the corresponding transaction payload from the transaction data store. This step may also include creating a new EDN invocation context and setting the user mode to the user who initially submitted the first transaction. The transaction initiation process may again be invoked to raise a new EDN event to indicate that a new transaction is submitted, and the new composite instance and BPEL processes may be initiated. As described above, these processes may execute each of the corresponding validations or the new transaction record (610), and the SOA system may generate an indication that all of the validations are successful (612). The transaction record may then be committed to the database and the status may be changed to "terminal" (614).

It should be appreciated that the specific steps illustrated in FIG. 6 provide particular methods of resubmitting a faulted database transaction record according to various embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
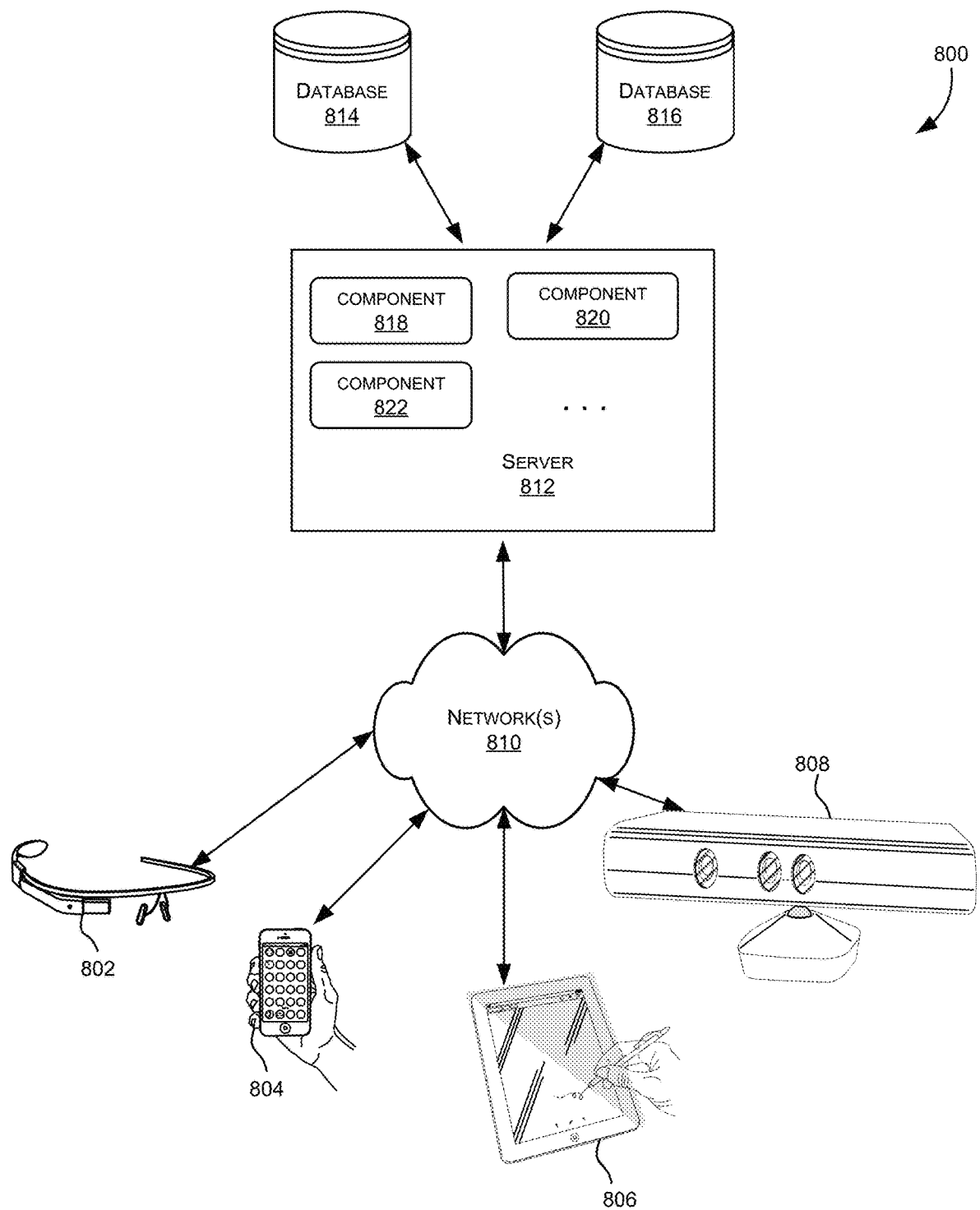
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
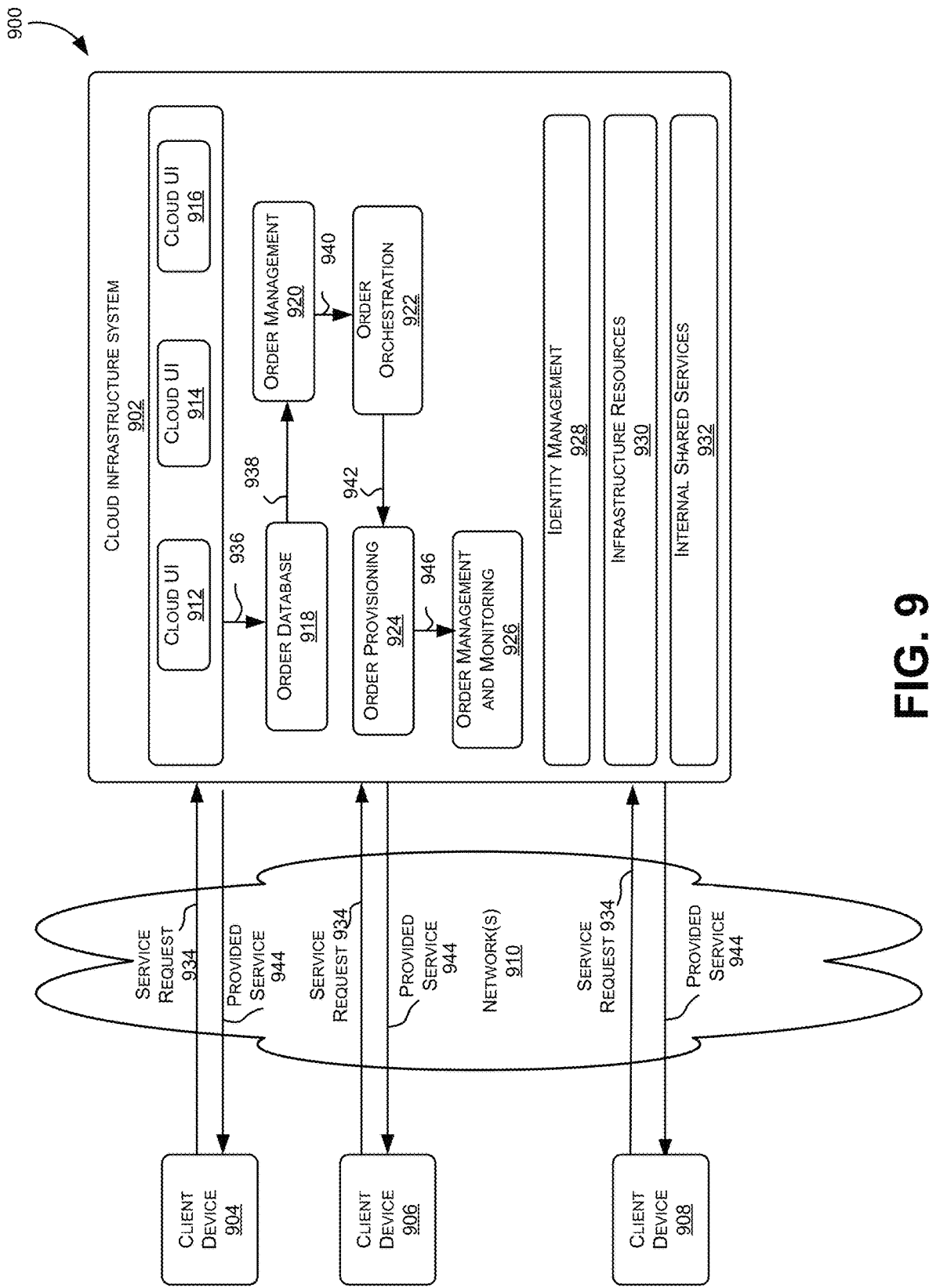
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
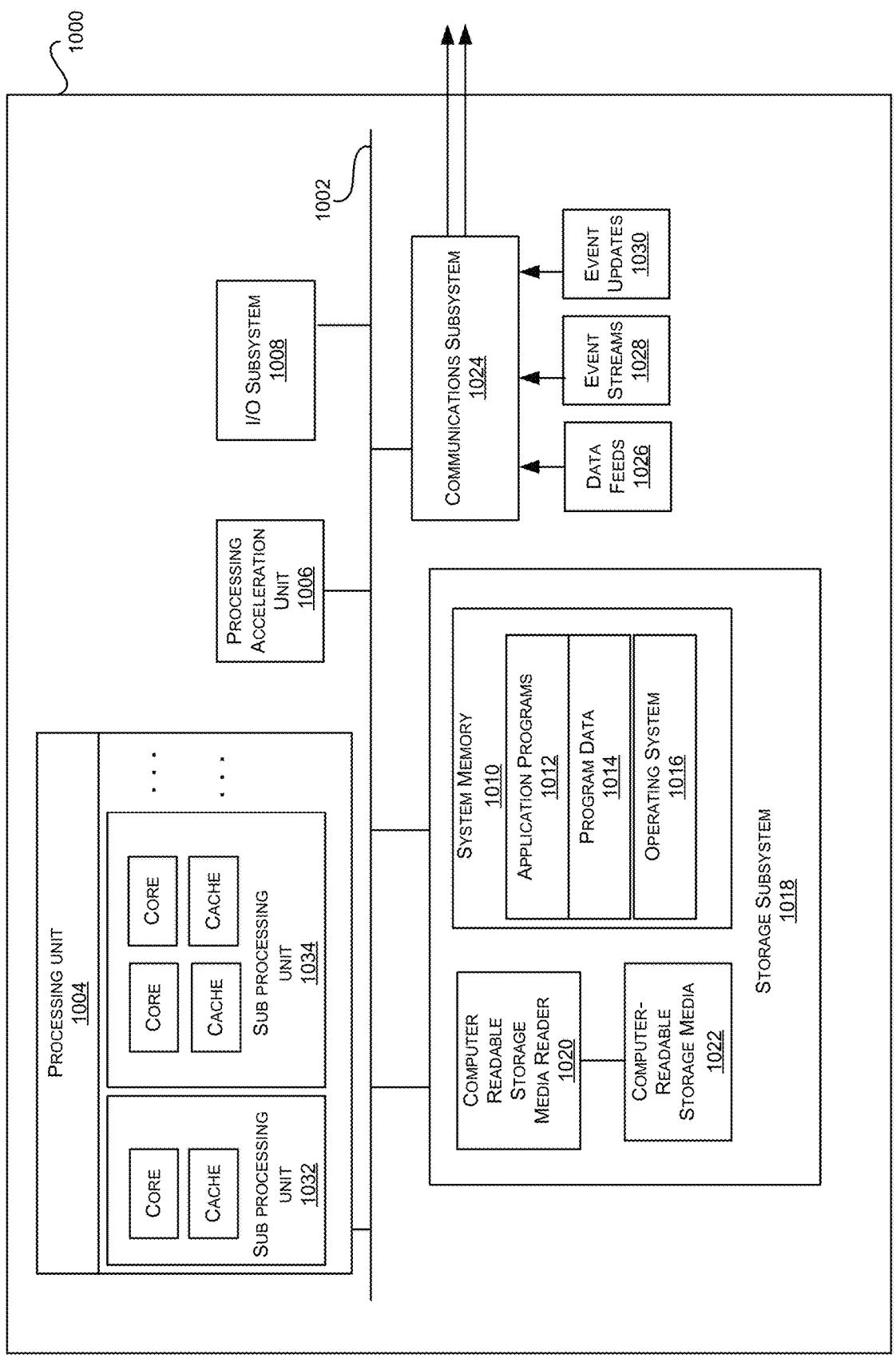
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, causes the one or more processors to perform operations comprising:
   receiving a first transaction to be committed to a database, wherein the first transaction requires one or more validations before being committed to the database;
   writing a transaction object to a transaction data store, wherein the transaction object comprises an invocation context for the first transaction, and the invocation context comprises metadata that describes an origin of the first transaction generated at least in part from a user profile of a user account that submitted the first transaction;
   submitting the first transaction to a process for performing the one or more validations;
   determining that at least one of the one or more validations for the first transaction failed;
   retrieving the transaction object from the transaction data store;
   copying the invocation context from the transaction object to a second transaction, wherein the copying includes copying at least the metadata that describes an origin of the first transaction generated at least in part from the user profile from the transaction object to the second transaction; and
   submitting the second transaction to the process for performing the one or more validations.

2. The non-transitory computer-readable medium of claim 1, wherein the invocation context for the first transaction comprises a user context for the user account that submitted the first transaction.

3. The non-transitory computer-readable medium of claim 2, wherein the user context comprises a user name, a user identifier, and a creation time.

4. The non-transitory computer-readable medium of claim 2, wherein the second transaction is submitted to the process for performing the one or more validations by an administrative account that is different from the user account.

5. The non-transitory computer-readable medium of claim 1, wherein the operations further comprise copying a transaction payload from the transaction object to the second transaction.

6. The non-transitory computer-readable medium of claim 1, wherein submitting the second transaction to the process for performing the one or more validations comprises:
generating an event to notify a Service Oriented Architecture (SOA) system such that the SOA causes one or more Business Process Execution Language (BPEL) processes to perform the one or more validations.

7. The non-transitory computer-readable medium of claim 6, wherein the operations further comprise:
sending an indication to an SOA fault handler when the one or more BPEL processes determine that at least one of the one or more validations for the first transaction failed.

8. The non-transitory computer-readable medium of claim 7, wherein the operations further comprise:
writing, by the SOA fault handler, an indication that the one or more validations for the first transaction failed to the transaction object in the transaction data store.

9. The non-transitory computer-readable medium of claim 1, wherein the operations further comprise:
determining that each of the one or more validations for the second transaction was successful; and
causing the second transaction to be committed to the database.

10. The non-transitory computer-readable medium of claim 1, wherein the operations further comprise:
writing a second transaction object for the second transaction to the transaction data store.

11. The non-transitory computer-readable medium of claim 1, wherein the operations further comprise, after determining that at least one of the one or more validations for the first transaction failed:
determining a runtime status of the first transaction; and
determining that the runtime status of the first transaction allows the second transaction to be submitted.

12. The non-transitory computer-readable medium of claim 11, wherein the runtime status of the first transaction indicates that the first transaction is in progress, and an SOA composite instance or BPEL task is in an error condition.

13. The non-transitory computer-readable medium of claim 11, wherein the runtime status of the first transaction indicates that the first transaction is submitted, and an event notifying an SOA system has been generated, but an SOA composite instance or BPEL task has not yet been created.

14. The non-transitory computer-readable medium of claim 11, wherein determining that the runtime status of the first transaction allows the second transaction to be submitted comprises:
accessing a data table that comprises a list of transaction statuses with corresponding transaction requirements to submit new transactions based on existing transactions.

15. The non-transitory computer-readable medium of claim 1, wherein the operations further comprise terminating the first transaction and clearing the transaction object from the transaction data store.

16. The non-transitory computer-readable medium of claim 1, wherein determining that at least one of the one or more validations for the first transaction failed comprises:
monitoring the transaction object in the transaction data store and an indication that the one or more validations for the first transaction failed generated by an SOA fault handler.

17. The non-transitory computer-readable medium of claim 1, wherein determining that at least one of the one or more validations for the first transaction failed comprises:
generating a transaction console application that provides a list of transactions to be committed to the database;
receiving a selection of the first transaction through the transaction console application; and
displaying a runtime status of the first transaction in the transaction console application.

18. The non-transitory computer-readable medium of claim 1, wherein the one or more validations comprise receiving an authorization from a user allowing the first transaction to be committed to the database.

19. A system comprising:
one or more processors; and
one or more memory devices comprising instructions that, when executed by the one or more processors, cause the one or more processors to perform operations comprising:
receiving a first transaction to be committed to a database, wherein the first transaction requires one or more validations before being committed to the database;
writing a transaction object to a transaction data store, wherein the transaction object comprises an invocation context for the first transaction, and the invocation context comprises metadata that describes an origin of the first transaction generated at least in part from a user profile of a user account that submitted the first transaction;
submitting the first transaction to a process for performing the one or more validations;
determining that at least one of the one or more validations for the first transaction failed;
retrieving the transaction object from the transaction data store;
copying the invocation context from the transaction object to a second transaction, wherein the copying includes copying at least the metadata that describes an origin of the first transaction generated at least in part from the user profile from the transaction object to the second transaction; and
submitting the second transaction to the process for performing the one or more validations.

20. A method of resubmitting faulted database transaction records, the method comprising:
receiving a first transaction to be committed to a database, wherein the first transaction requires one or more validations before being committed to the database;
writing a transaction object to a transaction data store, wherein the transaction object comprises an invocation context for the first transaction, and the invocation context comprises metadata that describes an origin of the first transaction generated at least in part from a user profile of a user account that submitted the first transaction;
submitting the first transaction to a process for performing the one or more validations;
determining that at least one of the one or more validations for the first transaction failed;
retrieving the transaction object from the transaction data store;
copying the invocation context from the transaction object to a second transaction, wherein the copying includes copying at least the metadata that describes an origin of the first transaction generated at least in part from the user profile from the transaction object to the second transaction; and submitting the second transaction to the process for performing the one or more validations.

* * * * *